ated Patent [19]

United States Patent [19]
Franklin, Jr.

[11] Patent Number: 4,462,423
[45] Date of Patent: Jul. 31, 1984

[54] CO₂ SNOW FORMING HEADER

[76] Inventor: Paul R. Franklin, Jr., 5211 W. Beaver St., Jacksonville, Fla. 32205

[21] Appl. No.: 464,975

[22] Filed: Feb. 8, 1983

[51] Int. Cl.³ .............................................. A01G 15/00
[52] U.S. Cl. ............................... 137/561 A; 239/2 S; 239/567; 285/61; 285/158; 285/189
[58] Field of Search ............ 285/189, 158, 61; 137/561 R, 561 A; 239/2 S, 14, 518, 566, 567

[56] References Cited
U.S. PATENT DOCUMENTS

| | | | |
|---|---|---|---|
| 1,811,042 | 6/1931 | Desmond | 285/61 |
| 4,023,621 | 5/1977 | Olson | 239/567 |
| 4,175,615 | 11/1979 | Blair | 285/189 |
| 4,376,511 | 3/1983 | Franklin, Jr. | 239/14 |
| 4,393,017 | 7/1983 | Kim et al. | 239/567 |

Primary Examiner—A. Michael Chambers
Attorney, Agent, or Firm—Harvey B. Jacobson

[57] ABSTRACT

A closed bottom heat exchange tank is provided for containing $CO_2$ snow and the tank includes upstanding and interconnected side wall portions and a top wall extending between and interconnecting the upper marginal edges of the side wall portions. A $CO_2$ snow forming header pipe generally parallels and closely overlies the top wall and is removably anchored thereto by inverted U-shaped clamps secured to the top wall through the utilization of threaded fasteners. One end of the header pipe is open for sealed communication with a liquid $CO_2$ supply line and the other end of the header pipe is closed. A plurality of depending tubular nipples including upper ends shaped to conform to the underside of the header pipe have the upper ends thereof secured to the header pipe at points spaced longitudinally therealong and the lower end portions of the nipples are loosely received downwardly through openings formed in the top wall of the heat exchange tank. The lower portion of the supply line is provided with small diameter jet discharge bores formed therethrough opening into the upper ends of the nipples and the lower ends of the nipples are diametrically enlarged and open downwardly toward the bottom of the tank.

8 Claims, 2 Drawing Figures

$CO_2$ SNOW FORMING HEADER

BACKGROUND OF THE INVENTION

Various forms of heat exchange tanks for containing $CO_2$ snow heretofore have been provided and are adapted for removable placement in vehicle load bed bodies and other shipping containers of the closed type for maintaining the interiors of those bodies and containers chilled. Customarily, thermostatically controlled fans are provided for circulating the air within the closed bodies across the cooled external surfaces of the heat exchange tanks responsive to the temperature within the bodies rising above a predetermined maximum.

Most previously used heat exchange tanks of this type include interior header pipes equipped with one or more discharge nozzles for forming snow into the tanks as a result of liquid $CO_2$ being supplied to the header pipes under pressure. Also, it is pointed out that the time required to fill such a heat exchange tank with $CO_2$ snow varies according to the number of discharge nozzles and the effective size of the discharge nozzles.

Usually, a smaller cross sectional discharge nozzle or jet outlet opening will result in the production of a greater amount of $CO_2$ snow for a given amount of liquid $CO_2$ used. In some instances the users of heat exchange tanks of this type have personnel available and a savings in time required to fill a heat exchange tank with $CO_2$ snow is not important. However, if personnel for this purpose are not readily available and the driver of the associated vehicle or some other personnel are required to fill a plurality of heat exchange tanks with $CO_2$ snow, a savings in time becomes quite important.

Most previously known forms of heat exchange tanks include interior header pipes mounted within the tanks in a manner such that quick removal thereof is not possible. Accordingly, if it is desired to modify a heat exchange tank to include larger discharge jet apertures or nozzles to allow more rapid filling of the tanks with $CO_2$ snow (even though this results in less snow being formed per pound of liquid $CO_2$) considerable time must be spent in removing, modifying and reinstalling the header pipes or manifolds to enable short tank filling times.

Inasmuch as some tanks are rented and may be used during alternate weeks for customers who wish to use a slower economical fill rate and those who wish to use a faster less economical fill rate, a need exists for a heat exchange tank including a header or manifold pipe which may be quickly removed, modified and reinstalled.

BRIEF DESCRIPTION OF THE INVENTION

The heat exchange tank of the instant invention is constructed in a manner whereby the header pipe or manifold thereof may be quickly removed, modified as desired and reinstalled with a minimum of effort. Further, the header pipe or manifold for charging the tank includes outlet nipples or nozzles which open directly into the tank through the top wall thereof and which include discharge ends which are of greater cross sectional area than the inlet ends thereof to provide for a swirl type discharge of $CO_2$ gas through the nipple and downwardly into the heat exchange tank toward the lower end thereof. In this manner, the liquid $CO_2$ initially discharged from the small diameter bores in the header or manifold pipe contacts the chilled inner surfaces of the nipple and is reduced in temperature to the triple point before being transformed into $CO_2$ snow, thereby achieving a more direct transformation of the liquid $CO_2$ into $CO_2$ snow.

The main object of this invention is to provide a $CO_2$ snow chargeable heat exchange tank including a supply and discharge manifold which may be readily removed from the tank and modified as desired between periods of usage of the tank.

Another object of this invention is to provide a heat exchange tank supply manifold and discharge nozzle assembly constructed in a manner whereby a greater amount of $CO_2$ snow may be formed within the tank for a given amount of liquid $CO_2$ supplied to the tank.

Yet another object of this invention is to provide a heat exchange tank including structure thereof which not only facilitates in quick removal of the supply manifold thereof but also facilitates ready exhausting of $CO_2$ gas from the tank during filling operations.

A final object of this invention to be specifically enumerated herein is to provide a heat exchange tank in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
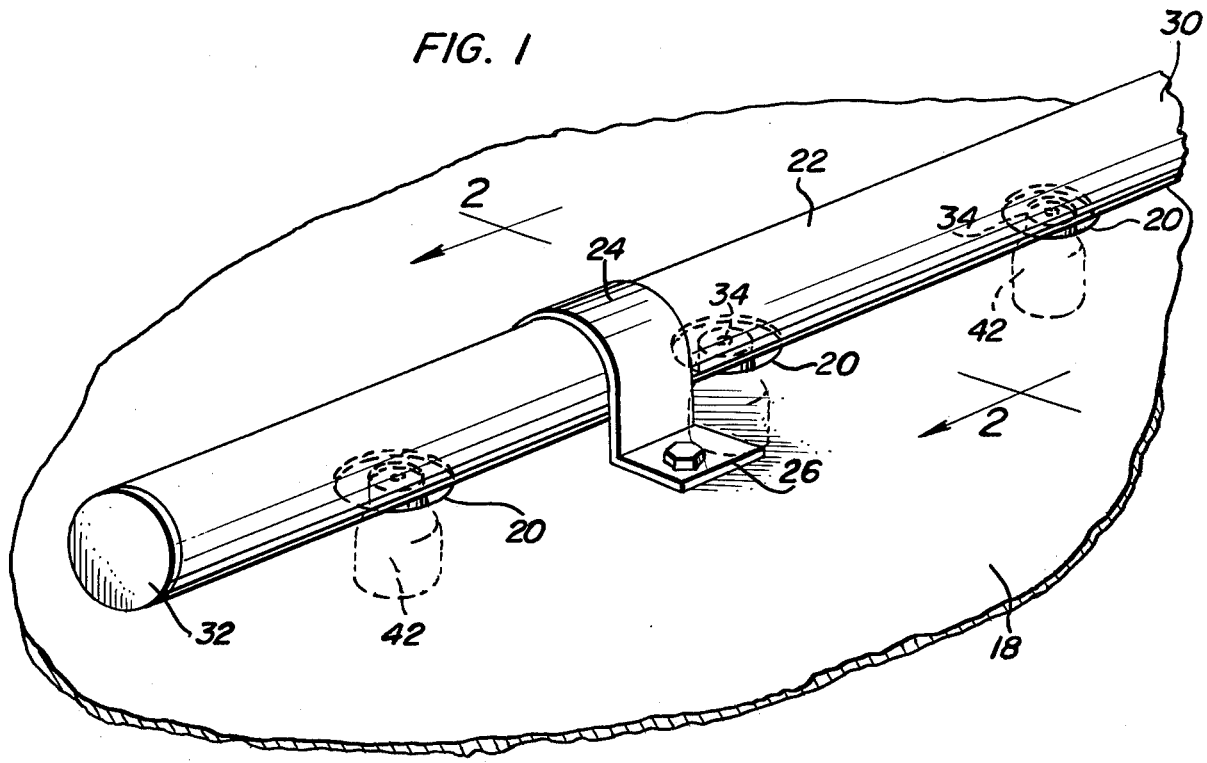
FIG. 1 is a fragmentary perspective view of the upper portion of a heat exchange tank constructed in accordance with the present invention.
Figure 2:
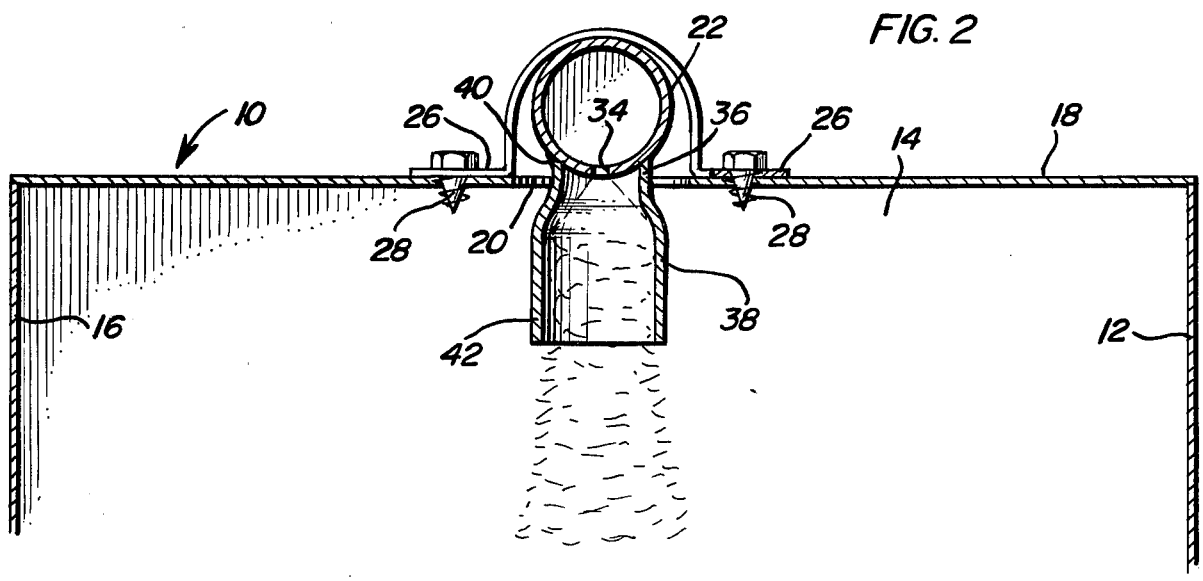
FIG. 2 is an enlarged fragmentary vertical sectional view taken substantially upon the plane indicated by the section line 2—2 of FIG. 1.

Referring now more specifically to the drawings the numeral 10 generally designates a heat exchange tank constructed in accordance with the present invention. The tank 10 includes peripherally interconnected upstanding side wall portions 12, 14 and 16 and the tank is closed at its lower end by a bottom wall (not shown). The upper end of the tank 10 is closed by a top wall 18 extending and secured between the upper marginal edges of the side walls 12, 14 and 16 and the top wall 18 includes a plurality of openings 20 formed therein along a straight path extending across the top wall 18.

A header pipe 22 is provided and is secured in overlying relation to the top wall 18 through the utilization of a plurality of longitudinally spaced downwardly opening U-shaped clamps 24 each including a pair of oppositely and outwardly directed apertured mounting ears 26 downwardly through which hexagonally headed sheet metal fasteners 28 are passed and threadedly engaged through the top wall 18. In lieu of the sheet metal fasteners 28, machine thread screws or bolts may be used in conjunction with suitable threaded nut members (not shown) secured to the underside of the top wall 18 in any convenient manner.

The header pipe 22 is open at one end portion 30 thereof for sealed communication with a supply line through which liquid $CO_2$ may be pumped under pressure and the other end portion of the header or manifold pipe 22 is closed by an end wall 32 sealingly secured thereacross.

The header pipe 22 includes a plurality of small diameter bores 34 formed in the lower wall portion thereof in registry with the openings 20 and contoured upper end portions 36 of a plurality of tubular nipples 38 are shaped to conform to the underside of the header pipe 22 and are secured thereto by soldering 40 or other similar means.

The bores 34 are approximately 3/32 of an inch in diameter, the openings 20 are approximately $1\frac{1}{8}$ inches in diameter, the upper end portion of each nipple 38 is approximately $\frac{5}{8}$ of an inch in diameter and the lower end portion 42 of each nipple 38 is diametrically enlarged and approximately $\frac{3}{4}$ of an inch in diameter.

When it is desired to fill the tank 10 with $CO_2$ snow, liquid $CO_2$ under pressure is supplied to the header pipe 22 and discharged therefrom through the bores 34 and into the nipples 38. As the liquid $CO_2$ is reduced in pressure upon being discharged from the bores 34, its temperaure is reduced to a point above the triple point and the spray of liquid $CO_2$ is discharged from the bores 34 in a swirl pattern and contacts the inner surfaces of the lower end portions 42 of the nipples 38. This of course causes the nipples 38 to be reduced in temperature whereupon subsequent liquid $CO_2$ discharged from the bores 34 and contacting the inner surfaces of the lower end portions 42 of the nipples 38 is reduced in temperature to the triple point. As the liquid $CO_2$ is expanded at the triple point it is transformed directly into a maximum quantity of $CO_2$ snow directed downwardly toward the bottom of the tank 10 so as to more compactly fill the tank 10 from the bottom up. As some of the $CO_2$ liquid is transformed into $CO_2$ gas, the gas is vented from the tank through the openings 20.

If it is desired to enlarge the diameters of the bores 34, it is merely necessary to remove the fasteners 28, upwardly withdraw the header pipe 22 from the top wall 18 and to thereafter ream or bore the bores 34 to a larger size. On the other hand, if it is desired to reduce the diameters of the bores 34, the header pipe 22 is removed in the same manner and the bores 34 are soldered closed and then redrilled at the desired diameter. Thereafter, the header pipe 22 may be readily reinstalled on the top wall 18 of the tank 10.

By having the header pipe 22 supported exteriorly of the top wall 10 and the nipples 38 projecting downwardly through the large diameter openings 20, the header pipe 22 may be readily removed for servicing as desired according to the needs of the next user of the tank 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A closed bottom heat exchange tank for containing $CO_2$ snow, said tank including upstanding and interconnected side wall portions and a top wall extending between and interconnecting the upper marginal edge portions of said side wall portions, a $CO_2$ snow forming header pipe generally paralleling and closely overlying said top wall, means removably anchoring said header pipe to said top wall, one end of said header pipe being open for sealed communication with a liquid $CO_2$ supply line and the other end of said header pipe being closed, a plurality of depending tubular nipples including upper ends shaped to conform to the opposing external lower surfaces of said header pipe and secured to the latter at points spaced longitudinally therealong, said lower surfaces including means defining restricted flow outlet openings therethrough opening downwardly into the interiors of the upper ends of said nipples, said top wall including a plurality of openings formed therethrough and downwardly through which said nipples extend and are loosely received for upward retraction of said nipples through said openings, said nipples each including a minimum cross sectional area at least several times the minimum cross sectional area of the corresponding outlet openings.

2. The heat exchange tank of claim 1 wherein said nipples include small inside cross sectional upper end portions and larger inside cross sectional area lower end portions.

3. The heat exchange tank of claim 2 wherein said outlet openings comprise small diameter bores formed through the lower wall portion of said header pipe.

4. The heat exchange tank of claim 1 wherein the upper ends of said nipples are sealingly secured to the lower surfaces of said header pipe surrounding and spaced outwardly from the corresponding small diameter bores.

5. The heat exchange tank of claim 1 wherein said means removably anchoring said header pipe to said top wall includes downwardly opening inverted U-shaped clamps embracingly engaged over the upper portions of said header pipe at points spaced therealong and removably anchored relative to said top wall by threaded fasteners passed downwardly through said clamps and threadedly anchored relative to said top wall.

6. The heat exchange tank of claim 5 wherein said nipples include small inside cross sectional upper end portions and larger inside cross sectional area lower end portions.

7. The heat exchange tank of claim 6 wherein said outlet openings comprise small diameter bores formed through the lower wall portion of said header pipe.

8. The heat exchange tank of claim 7 wherein the upper ends of said nipples are sealingly secured to the lower surfaces of said header pipe surrounding and spaced outwardly from the corresponding small diameter bores.

* * * * *